(12) United States Patent
Wirthlin

(10) Patent No.: US 9,068,875 B1
(45) Date of Patent: Jun. 30, 2015

(54) OPTICAL LIQUID LEVEL TRANSDUCER

(76) Inventor: Alvin R. Wirthlin, Spanish Fork, UT (US)

(*) Notice: Subject to any disclaimer, the term of this patent is extended or adjusted under 35 U.S.C. 154(b) by 475 days.

(21) Appl. No.: 13/533,633

(22) Filed: Jun. 26, 2012

Related U.S. Application Data

(60) Provisional application No. 61/501,218, filed on Jun. 26, 2011.

(51) Int. Cl.
G01F 23/00 (2006.01)

(52) U.S. Cl.
CPC ............ *G01F 23/00* (2013.01); *G01F 23/0061* (2013.01)

(58) Field of Classification Search
CPC . G01F 23/0076; G01F 23/00; G01F 23/0069; G01N 2223/42
USPC ............... 250/573, 576; 73/293, 291, 304 R; 702/55, FOR. 131, FOR. 127
See application file for complete search history.

(56) References Cited

U.S. PATENT DOCUMENTS

| | | | | |
|---|---|---|---|---|
| 6,449,419 B1 * | 9/2002 | Brough et al. | ................. | 385/136 |
| 7,109,512 B2 * | 9/2006 | Wirthlin | ......................... | 250/573 |
| 7,259,383 B2 * | 8/2007 | Wirthlin | ......................... | 250/573 |
| 8,189,042 B2 * | 5/2012 | Pollack et al. | ................... | 348/82 |
| 2005/0231354 A1 * | 10/2005 | Riedel et al. | .................... | 340/531 |
| 2006/0006353 A1 * | 1/2006 | Wirthlin | ......................... | 250/573 |

* cited by examiner

*Primary Examiner* — Nina Bhat
(74) *Attorney, Agent, or Firm* — Alvin R. Wirthlin

(57) ABSTRACT

An optical liquid level transducer is provided that eliminates the need for moving parts, linearization, temperature compensation, material incompatibility with fuel, light output and sensing fluctuations due to temperature changes, and so on. As described, the liquid level is digitally sensed by analyzing axial images of the probe section and outputting changes in liquid level accordingly. The optical liquid level transducer employs an absolute measurement technique with no moving parts such that when power is turned off and restored to the fuel sender, liquid level is automatically determined even if the fuel level in the tank were to change during the "power-off" condition. The optical liquid level transducer is independent of liquid type, temperature and other environmental factors, and does not require special materials that may be incompatible with fuel.

22 Claims, 8 Drawing Sheets

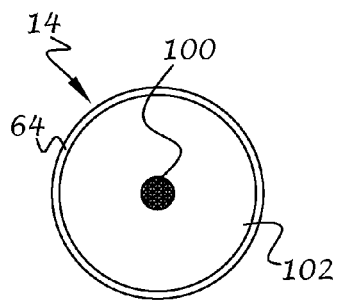 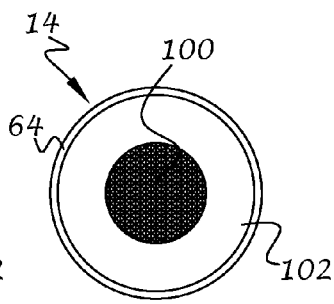 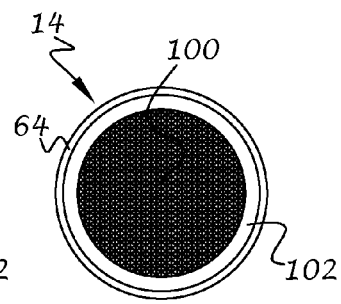
FIG. 3A  FIG. 3B  FIG. 3C
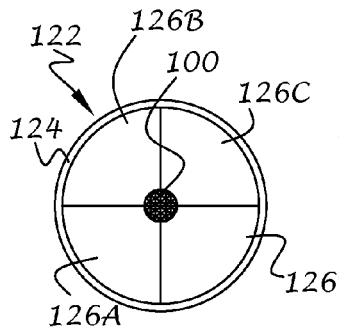 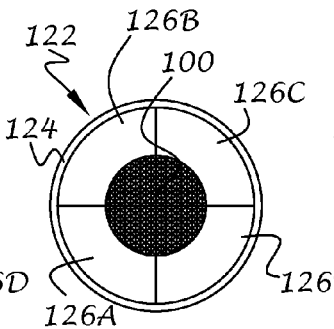 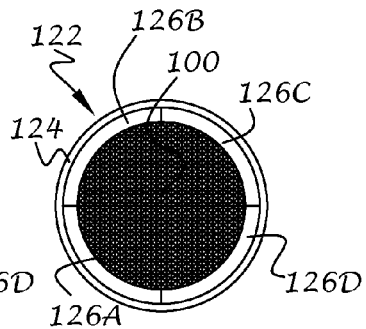
FIG. 4A  FIG. 4B  FIG. 4C
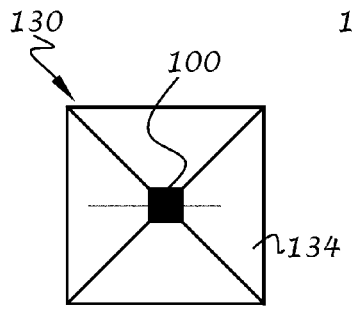 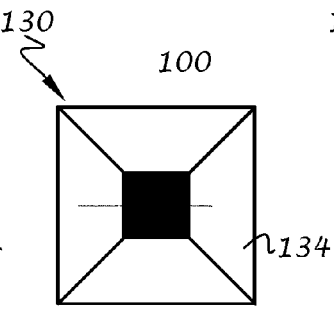 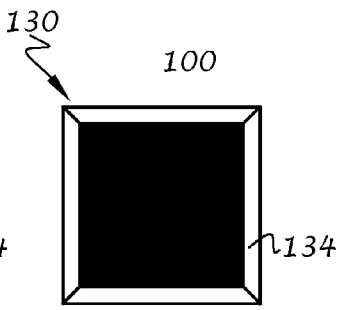
FIG. 5A  FIG. 5B  FIG. 5C

US 9,068,875 B1

OPTICAL LIQUID LEVEL TRANSDUCER

CROSS REFERENCE TO RELATED APPLICATIONS

This application claims the benefit of U.S. Provisional Application No. 61/501,218 filed on Jun. 26, 2011, the disclosure of which is hereby incorporated by reference.

BACKGROUND OF THE INVENTION

This invention relates to optical transducers, and more particularly to optical transducers for determining liquid level.

Transducers for measuring liquid level are often used in vehicles, industrial equipment and other systems and components. The electrical output of such transducers change in response to a change in the liquid being measured, and is typically in the form of a change in resistance, capacitance, current flow, magnetic field, frequency, and so on. These types of transducers may include variable capacitors or resistors, optical components, Hall Effect sensors, strain gauges, ultrasonic devices, and so on.

By way of example, prior art liquid level sensors, such as fuel level sensors for motor vehicles, usually include a float that rides on an upper surface of the fuel in a fuel tank. The float is typically connected to one end of a pivot arm while the other end of the pivot arm includes a wiper mechanism that brushes against a resistor strip when the arm is rotated due to a change in fuel level in the tank. Such sensors are prone to wear, mechanical and/or electrical breakdown or, at the very least, inaccurate liquid level detection.

In an effort to overcome these drawbacks, liquid level transducers with no moving parts have been developed. Such sensors include heated wires or film with the liquid being measured functioning as a heat sink, variable capacitance devices with the measured liquid functioning as the dielectric, ultrasonic devices, optical devices, and Hall-Effect type devices. Many of these liquid level transducers suffer from one or more of the following drawbacks: the detection of liquid level may be inaccurate; fine wires can be affected by vibration and movement, such as with heated wire probes; fuel additives and contaminants can cause corrosion of various transducer components; the electrical output of the transducer may vary due to water or contaminants in the fuel, such as with capacitance-type probes; and such transducers may be cost-prohibitive in many transportation markets that require a low-cost solution.

BRIEF SUMMARY OF THE INVENTION

According to one aspect of the invention, an optical liquid level transducer comprises a probe section having a measurement surface adapted to extend into a liquid to be measured; a light source positioned for directing radiant energy into the optical probe section and onto at least one of the measurement surface and the liquid to be measured; an image module positioned above the probe section and oriented for capturing an image in an axial direction of at least a portion of the measurement surface; and a processor for determining a liquid level condition based on the captured image.

According to a further aspect of the invention, a method of determining a liquid level condition within a container comprises extending a probe with a measurement surface into a liquid to be measured; capturing a digital image of at least a portion of the measurement surface in an axial direction; and determining a liquid level condition based on the captured digital image.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIGS. 3A-3C are top plan views of a probe section of the liquid level transducer illustrating different fill levels;

FIGS. 4A-4C are top plan views of a probe section in accordance with a further embodiment of the invention illustrating different fill levels;

FIGS. 5A-5C are top plan views of a probe section in accordance with another embodiment of the invention illustrating different fill levels;

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
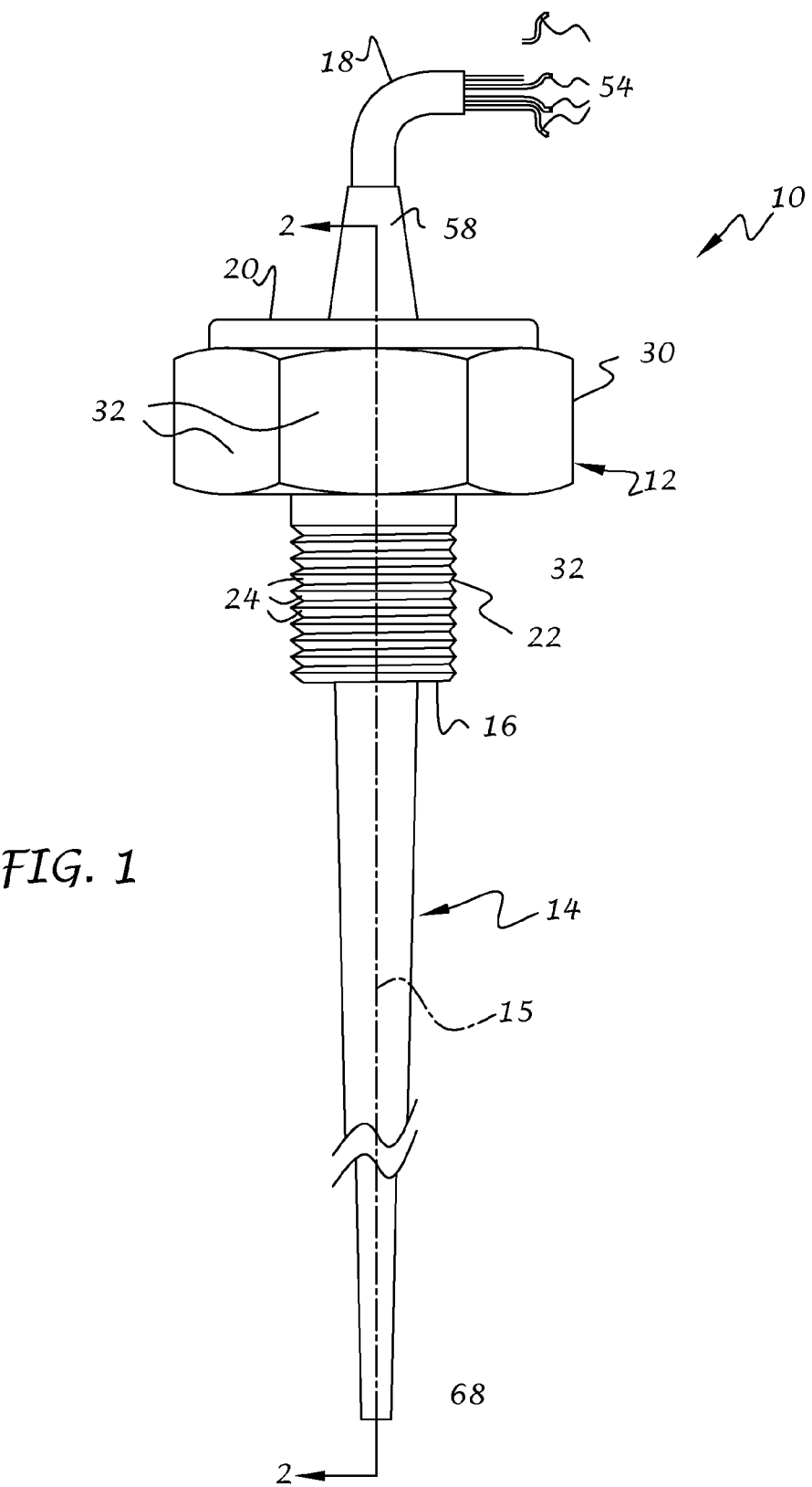
FIG. 1 is a side elevational view of an optical liquid level transducer in accordance with the present invention.
Figure 2:
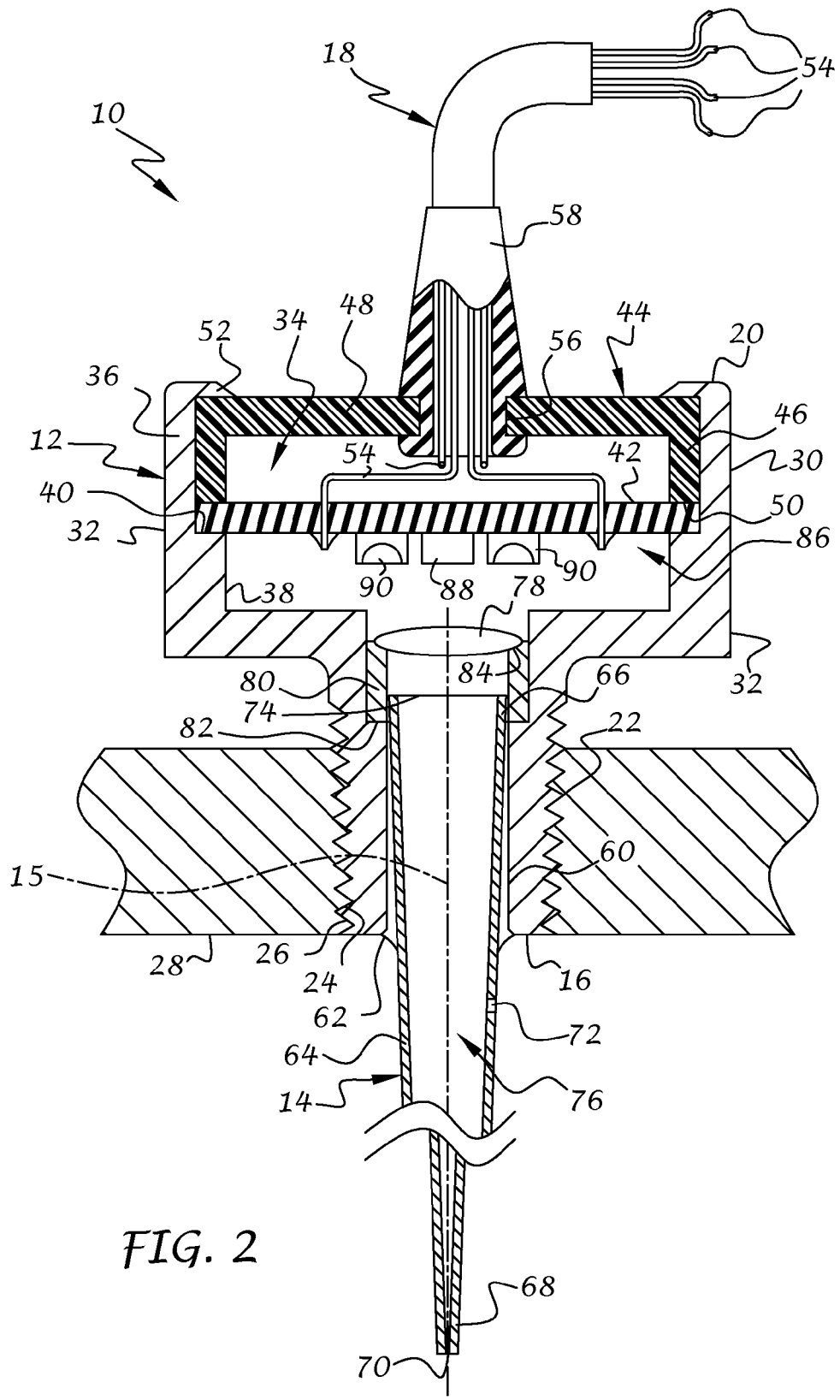
FIG. 2 is a longitudinal sectional view of the optical liquid level transducer taken along line 2-2 of FIG. 1.

Referring to the drawings, and to FIGS. 1 and 2 in particular, an optical liquid level transducer 10 in accordance with the present invention is illustrated. The optical transducer 10 preferably includes a housing 12, an optical probe section 14 extending along a central axis 15 from a lower end 16 of the housing 12, and a wiring harness 18 extending outwardly from an opposite end 20 of the housing.

The housing 12 can be constructed of any suitable material, such as aluminum, brass, or other metals, plastic, ceramic, and so on. The housing 12 preferably includes a mounting section 22 with external threads 24 for engagement with internal threads 26 (FIG. 2) of a container 28, which may be in the form of a tank, vessel, or the like. The housing 12 also preferably includes a securing section 30 with generally flat, external faces 32 for engagement by a wrench or the like (not shown) for installing and removing the optical liquid level transducer 10 with respect to the container 28 in a well-known manner. The securing section 30 preferably has a wall 36 with the external faces 32 formed thereon and a generally cylindrical interior cavity 34 delimited by an interior surface 38 of the wall. It will be understood that the particular configuration of the housing 12 will largely depend on the mounting arrangement of the container 28. Accordingly, the external threads 24 and external faces 32 may be eliminated and other mounting means may be provided without departing from the spirit and scope of the invention. By way of example, a common five-hole flange can be used as the mounting means in place of the housing 12.

An annular step 40 (FIG. 2) is formed in the interior surface 38 for supporting a circuit board 42 within the cavity 34. An end cap 44 has an annular side wall portion 46 and a plate or disk portion 48 connected to the side wall portion. The annular side wall portion 46 is preferably in sealing engagement with the interior surface 38 of the wall 36. An end 50 of the annular side wall portion 36 opposite the disk portion 48 abuts the circuit board 42 and holds it in place against the annular step 40. An annular flange 52 of the wall 36 can be pressed, rolled or otherwise deformed over the disk portion 48 to hold the end cap and circuit board in the interior cavity 34. It will be understood that other means for holding the components together can be employed, such as adhesive, welding, heat staking, and so on.

Electrical wires 54 from the circuit board 42 exit the housing 12 through a central opening 56 formed in the disk portion 48. A strain relief device 58 may be mounted in the opening 56 with the wires 54 extending therethrough in a well-known manner.

In accordance with a further embodiment of the invention, the wires, strain relief device and/or end cap may be replaced with a male or female plug portion with electrical connectors (not shown) for mating with a female or male plug portion (not shown), respectively, of the vehicle or system on which the liquid level transducer 10 is to be installed.

The mounting section 22 preferably has a central bore 60 that, before installation of the optical probe section 14, intersects the interior cavity 34. The optical probe section 14 extends through the central bore 60 and is preferably sealingly connected to the mounting section 22 at the lower end 16 of the housing 12 through an epoxy adhesive layer 62 or the like to prevent liquid from entering the bore 60 and interior cavity 34. It will be understood that other means for connecting and/or sealing the optical probe to the housing can be used, such as press-fitting the probe in the housing, insert or injection molding the probe directly to the housing, using one or more O-rings between the probe and housing, ultrasonically welding the probe to the housing, using other types of adhesives and sealants, and so on.

The optical probe section 14 is preferably in the form of a hollow conical tube with a side wall 64 that extends from a larger diameter upper end 66 to a smaller diameter lower end 68 to thereby form a hollow interior 76 for receiving the liquid to be measured. A lower opening 70 is formed at the lower end 68 to permit the ingress of the liquid. Likewise, an intermediate opening 72 is formed through the side wall 64 at a location proximal to the lower end 16 of the housing 12 to allow the egress and ingress of fluid as the level of liquid in the container 28 changes. An upper opening 74 is formed at the upper end 66 of the probe. Although the probe section 14 in the preferred embodiment has a circular cross section, it will be understood that the probe can have other cross dimensional shapes, such as oval, square, triangular, and so on, without departing from the spirit and scope of the invention.

A lens 78 is preferably located within the housing 12 and in coaxial alignment with the probe section 14. An annular spacer 80 is positioned on a lower internal shoulder 82 of the housing 12 and extends around the upper end 66 of the probe section 14. A seat 84 is formed on the spacer 80 for receiving the lens 78. Although the upper opening 74 is shown as spaced from the lens 78, it will be understood that the lens can be directly mounted on the opening and/or the opening can be closed by a transparent cover (not shown) without departing from the spirit and scope of the invention. In some applications, it may be possible to eliminate the lens.

Figure 9:
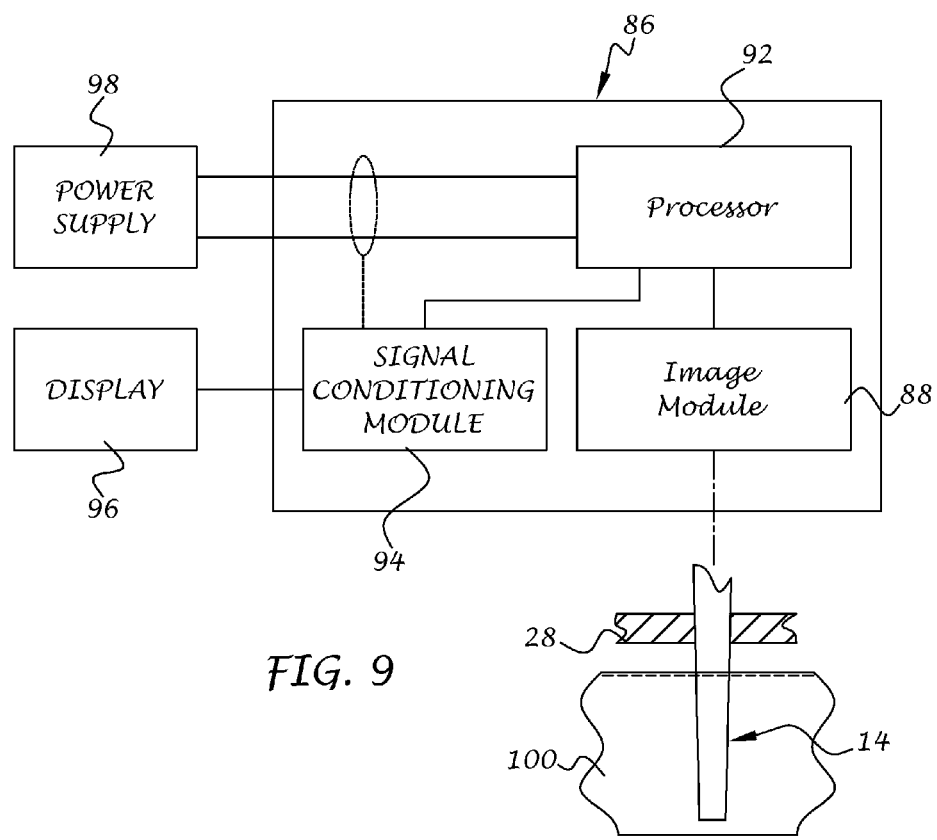
FIG. 9 is a schematic view of an electronics section of the liquid level transducer.

With reference to FIGS. 2 and 9, an electronics section 86 preferably includes the PCB 42, a digital image module 88 mounted on the underside of the PCB in alignment with the lens 78 and probe section 14, and one or more light sources 90 located on either side of the image module 88 for projecting radiant energy through the lens and into the hollow interior 76 of the probe.

The digital image module is preferably of a low-cost variety commonly used in other mass-produced applications such as mobile phones, smart phones, digital cameras. Under present market conditions, the sheer number of such modules produced in mass quantity has resulted in very low pricing that lends well to low-cost liquid level measurement transducers in accordance with the invention. A suitable image module may include, but is not limited to, a CMOS image sensor with a predetermined array of light sensitive sensors or pixels to capture an image of the interior 76 of the probe section 14 focused by the lens 78. By way of example, the OV2655 CMOS camera chip sensor manufactured by OmniVision Technologies, Inc., has two megapixels of resolution with a 1,600×1,200 pixel (sensel) array and is capable of operation at 15 frames per second (fps) in full resolution. The data captured during imaging can be transferred either by a standard parallel digital video port (DVP) or by a single-lane MIPI high-speed serial interface with RAW RGB, RGB, YUV, and Compressed Data outputs. It will be understood that other image sensors with more or less resolution, color and/or black and white capabilities, as well as other image sensing technologies, such as charge-coupled devices (CCD), linear arrays, and so on, can be used without departing from the spirit and scope of the present invention.

The or each light source 90 is preferably of the LED type, and both the light source and image module can be surface-mount devices to efficiently optically couple the devices to the optical probe section 14. A shield (not shown) can be provided between the image module 88 and the light source 90 to prevent the direct transmission of stray light from the light source to the image module.

It will be understood that other light sources can be used, such as, without limitation, incandescent bulbs, laser diodes, or any other source that emits radiant energy in one or more of the visible, ultra-violet, or infra-red spectrums. It will be further understood that other photosensors can be used, such as, without limitation, photocells, photodiodes, and photoconductors.

It will be further understood that the position of the light source and image module may be reversed or located at other positions at the upper end of the optical probe section 14. In addition, the light source may be remotely located from the upper end of the optical probe and positioned for emitting light into the optical probe from its upper end and/or lower end through intermediate members such as fiber optics, transparent rods, or other suitable light guides.

Figure 6:
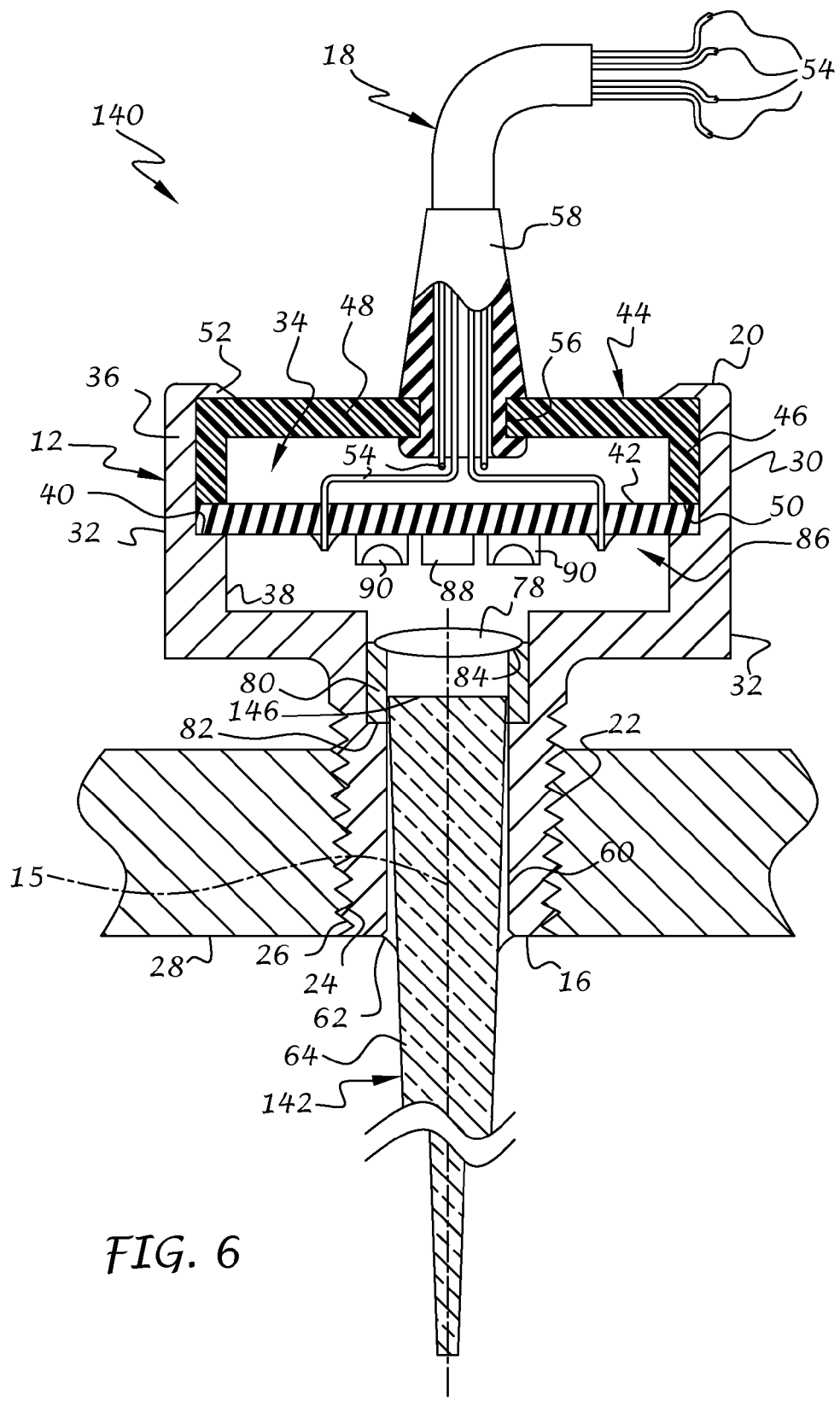
FIG. 6 is a longitudinal sectional view of an optical liquid level transducer in accordance with a further embodiment of the invention.

Other components of the electronics section can include a signal conditioning module 94 connected to the processor 92 for driving a display 96 based on signals from the processor. The signal conditioning module may also or alternatively be connected to the power supply 98 to protect the circuitry from electrical spikes, back-EMF emf, and other electrical anomalies associated with vehicles and other equipment. It will be understood that the signal condition module may form part of the processor circuitry or may be eliminated without departing from the spirit and scope of the invention. As shown in FIG. 6, the probe section 14 extends into the container 28 such that the liquid 100 being measured rises and falls as the container is respectively filled and emptied. The processor 92 can include means, such as software, circuitry, various electronic components, and so on, to process and analyze the captured digital image and determine a liquid level based on the captured image.

Referring now to FIGS. 3A-3C, the optical characteristics of the changing liquid level in the probe section 14 is illustrated, wherein FIGS. 3A, 3B and 3C are representative of a low, half-full and full liquid level conditions within the container, respectively. In the absence of liquid or when the liquid is at a low level within the probe section 14 as shown in 3A, a substantial portion of the inner surface 102 of the probe 104 is directly illuminated by the light source 90. Conversely, a relatively small portion of the inner surface will be less bright due to absorption of light through the liquid 100. Preferably, the wavelength of the light source is selected so that maximum absorption in the liquid occurs yet is capable of being sensed by the image module 88. When the liquid arrives at a higher position within the probe section 14 as shown in FIG. 3B, more of the inner surface 102 is covered by the liquid so that less of the inner surface is directly illuminated by the light source 90. When the liquid 100 arrives at an upper position within the probe section 14 as shown in FIG. 3C, a substantial portion of the inner surface 102 will be covered by the liquid so that a relatively small portion of the surface is directly illuminated. The axial images as represented by FIGS. 3A-3C and virtually any level condition between full and empty can be digitally sensed by the image module 88.

Figure 10:
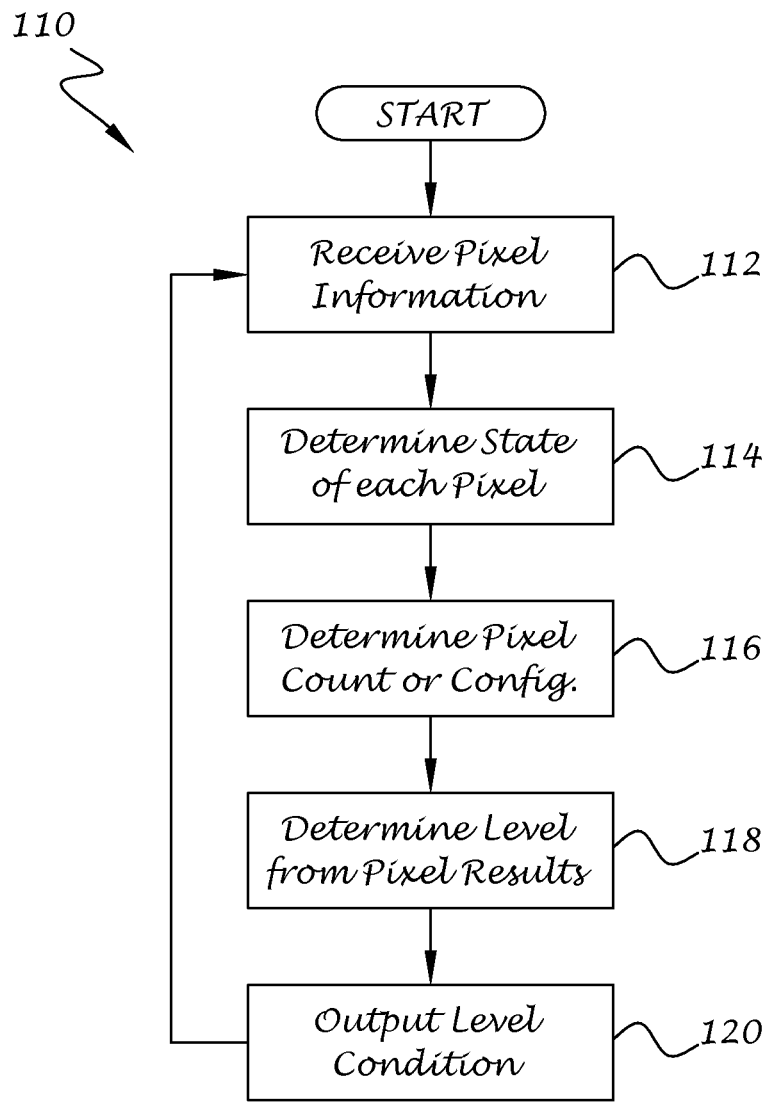
FIG. 10 is a flow diagram of a method for determining liquid level using one or more of the liquid level transducer embodiments.

Referring now to FIG. 10, an exemplary method 110 of determining liquid level 110 within a container is illustrated. At step 112, pixel information is received from the image sensor. At step 114, the state of each pixel is determined. This can be accomplished by setting a threshold value for a pixel "on" state when the pixel detects direct illumination of the inner surface 102 of the probe section 14 at a predetermined value and an "off" state when the pixel detects a brightness that is less than the predetermined value, indicative of the sensed portion of the inner surface being covered with a liquid.

In addition or alternatively, and in accordance with a further embodiment of the invention, when a color image module is used, the pixels can detect one or more colors for the liquid being measured and one or more colors for the inner surface 102 of the probe.

In accordance with yet a further embodiment of the invention, the light source can be arranged for illuminating the liquid being measured instead of the inner surface of the probe. With this arrangement, the pixel "on" state would be indicative of the area of the upper surface of the liquid rather than the area of the inner surface of the probe. At step 116, the pixel count, pattern of pixels having common characteristics, or configuration is determined. This can be accomplished by counting the number of pixels that are in an "on" state for example, or by determining the number of pixels of a color or colors indicative of the illuminated probe inner surface and/or the number of pixels of a color or colors indicative of the surface area of the liquid. With this arrangement, a low cost processor can be used for determining the liquid level state at step 118 and sending signals to the display 96 at step 120.

In accordance with a further embodiment of the invention, the processor and/or image module can recreate the captured image and, with suitable software, compare it to a database of images indicative of different liquid levels to determine a particular liquid level state.

With the above-described arrangement, an optical liquid level transducer is provided that eliminates the need for moving parts, linearization, temperature compensation, material incompatibility with fuel, light output and sensing fluctuations due to temperature changes, and so on. As described, the liquid level is digitally sensed by analyzing axial images of the probe section and outputting changes in liquid level accordingly. This invention employs an absolute measurement technique with no moving parts such that when power is turned off and restored to the fuel sender, liquid level is automatically determined even if the fuel level in the tank were to change during the "power-off" condition. The optical liquid level transducer of the present invention is also independent of liquid type, temperature and other environmental factors, and does not require special materials that may be incompatible with fuel. Importantly, this solution takes advantage of digital image sensing camera modules commonly found in portable electronic devices. Due to the sheer number of modules available and their wide popularity in other applications, such modules are readily available by various manufacturers at very low pricing.

Referring now to FIGS. 4A-4C, a top plan view of an optical probe section 122 in accordance with a further embodiment of the invention illustrating different fill levels is shown. The optical probe section 122 is somewhat similar in construction to the optical probe section 14 previously described, with the exception that the inner measurement surface 124 of the probe is divided into different segments 126A, 126B, 126C and 126D. Each segment preferably represents a different image feature, such as a different color projected by a different wavelength LED or other light source. In this manner, the number of pixels in each segment can be analyzed and compared to determine liquid level and provide redundancy where needed.

Referring now to FIGS. 5A-5C, a top plan view of an optical probe section 130 in accordance with a further embodiment of the invention illustrating different fill levels is shown. The optical probe section 130 is somewhat similar in construction to the optical probe section 14 previously described, with the exception that the probe section 130 is square in cross-section so as to form a pyramidal shape. The inner measurement surface 134 of the probe section can be similar to the inner surface 102 of the first probe embodiment or it can be associated with different optical features, such as different colors as described above with respect to the second probe embodiment. As shown however, the inner surface 134 is preferably provided with a pattern 136, such as a Quick Response (QR) code or other matrix barcode (or two-dimensional code) that is readable by image module 88 and recognized by the processor 92. As the liquid 100 in the probe section 130 rises, the matrix barcode can be arranged to directly interpret different liquid level conditions since the liquid 100 being measured would block a portion of the code to thereby generate a new code. For example, the FIG. 5A code would indicate an empty liquid level condition while the FIG. 5C code would indicate a full liquid level condition. It is contemplated that other code schemes or arrangements can be used without departing from the spirit and scope of the invention.

Referring now to FIG. 6, an optical liquid level transducer 140 in accordance with a further embodiment of the invention is illustrated. The transducer 140 is similar in construction to the transducer 10 previously described, with the exception that an optical probe section 142 is preferably in the form of a solid transparent body of generally elongate conical shape with an upper end 146 that faces the image module 88 and a lower end positioned at or near the bottom of the container 28. It will be understood that the optical probe section 142 can have other cross sectional shapes, such as oval, square, triangular, and so on.

It will be understood that the term "transparent" as used herein refers to a material condition that ranges from optically clear to opaque for various wavelengths of radiant energy. By way of example, some materials that allow transmission of a substantial amount of radiant energy in the visible light region of the electromagnetic spectrum may not allow significant transmission of radiant energy in the infrared or other regions. Accordingly, a suitable transparent material would allow the transmission of a measurable amount of radiant energy of a selected wave length through the probe section 142. By way of example, the probe section 142 can be constructed of glass material such as borosilicate or quartz; Teflon® material such as PTFE, FEP, ETFE; plastic material such as acrylic, nylon, polysulfone, polyetherimide, silicon, polyurethane, polycarbonate, and so on. However, it will be understood that the present invention is not limited to the particular materials described.

In the presence of liquid, the light from the light source will be refracted out of the optical probe 142 to thereby create a change in the image at a position on the probe corresponding to the height of liquid present on the probe. In order to reduce the surface energy of the optical probe 142 and repel liquids, a low surface energy film, such as fluorinated polymer, can be applied at least to the outer surface of the probe 142.

In accordance with a further embodiment of the invention, the probe 142 can be illuminated by applying radiant energy to the outer surface of the probe rather than radially into the body of the probe. Alternatively, the liquid being measured can be illuminated.

Turning now to FIGS. 7 and 8A-8C, an optical liquid level transducer 150 in accordance with a further embodiment of the invention is illustrated. The transducer 150 is similar in construction to the transducer 10 previously described, with the exception that an optical probe section 152 is preferably in the form of a hollow tube of rectangular cross section with a first vertically extending side wall 154, a second side wall 156 that extends downwardly toward the first side wall, and front and rear walls 158 and 160, respectively, that extend between the first and second side walls to thereby form a hollow interior 162 for receiving the liquid to be measured. A slot 164 is formed between the first and second side walls at a lower end 166 of the probe section 152 to permit the ingress of the liquid to be measured. Likewise, an intermediate opening 168 is formed through the side wall 154 (or other wall) at a location proximal to the lower end 16 of the housing 12 to allow the egress and ingress of fluid as the level of liquid in the container 28 changes.

Figures 8A, 8B, 8C:
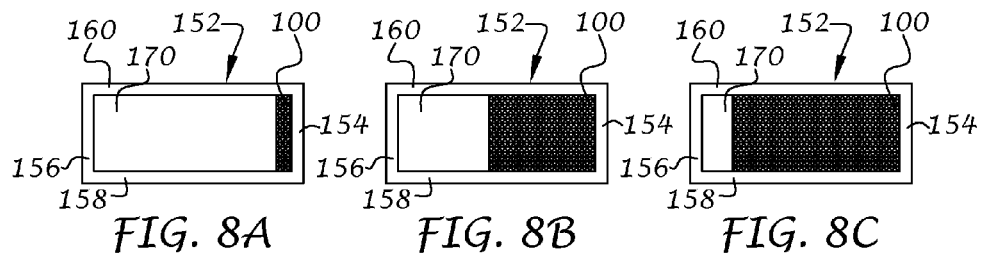
FIGS. 8A-8C are top plan views of a probe section of the liquid level transducer of FIGS. 7 and 7A illustrating different fill levels.

As in the FIG. 2 embodiment, the light source 90 is preferably positioned for projecting radiant energy into the hollow interior 162 of the probe section 152 so that the inner surface 170 of the second side wall 156 is illuminated. As the liquid 100 increases in height along the probe, as shown in FIGS. 8B and 8C, increasingly more of the inner surface 170 will be covered by the liquid, resulting in less light energy being transmitted to the image module 88. Since the probe section 152 is rectangular in cross section, the image module 88 can be in the form of a linear array of light sensors.

Figure 7:
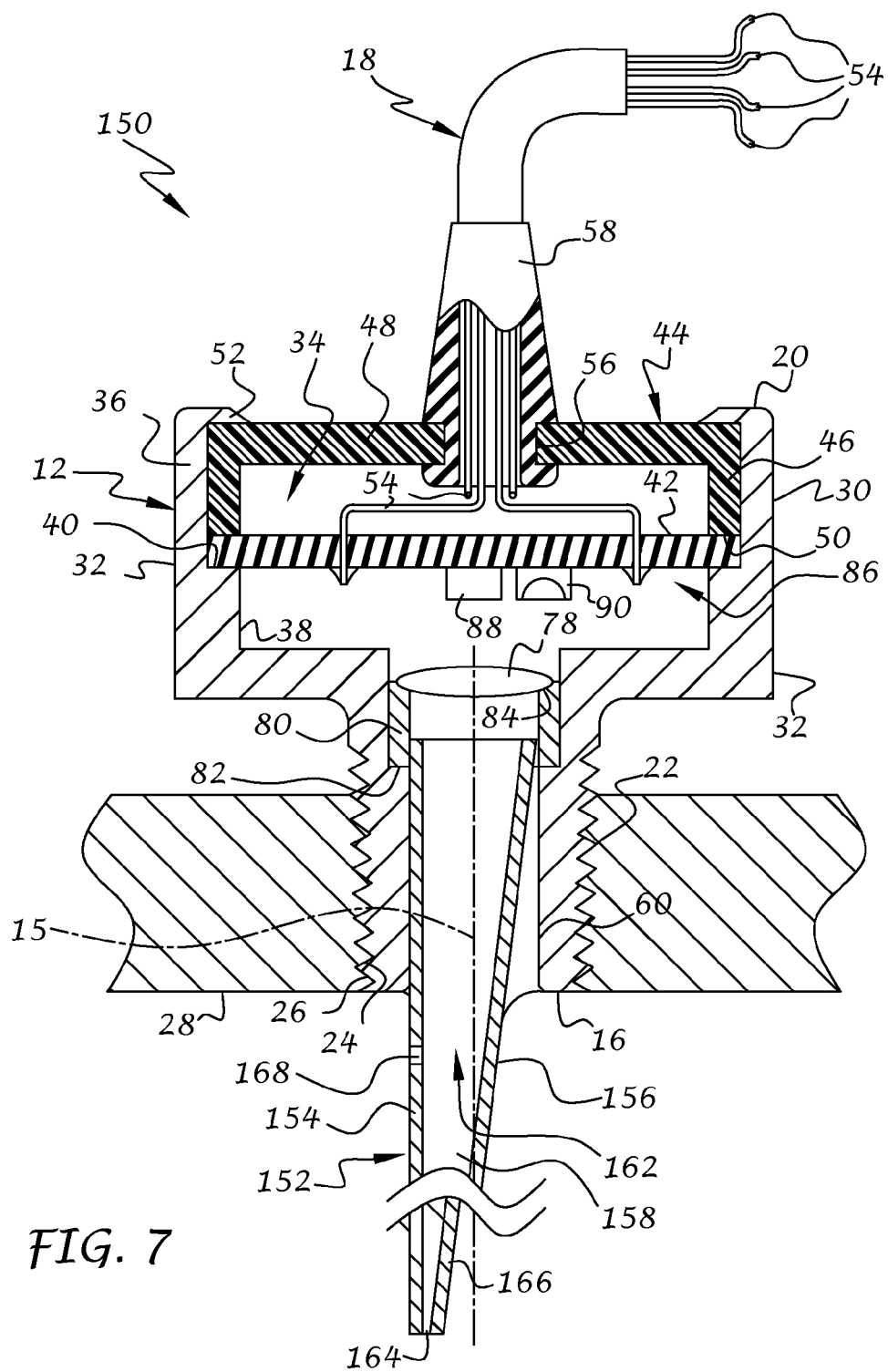
FIG. 7 is a longitudinal sectional view of an optical liquid level transducer in accordance with another embodiment of the invention.
Figure 7A:
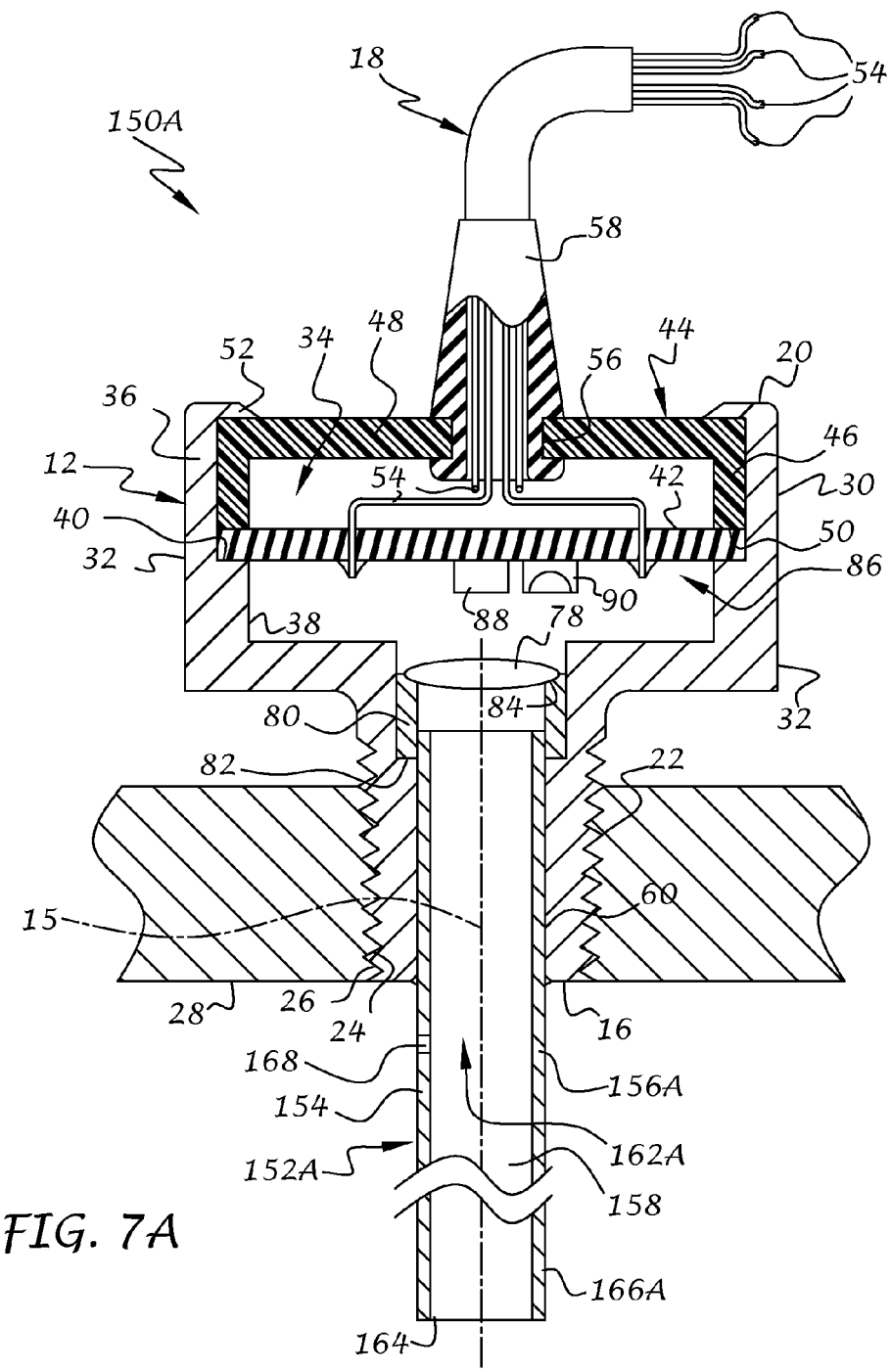
FIG. 7A is a longitudinal sectional view of an optical liquid level transducer in accordance with yet another embodiment of the invention.

Referring now to FIG. 7A, an optical liquid level transducer 150A in accordance with a further embodiment of the invention is illustrated. The transducer 150A is similar in construction to the transducers 150 and 10 previously described, with the exception that an optical probe section 152A is preferably in the form of a hollow tube of rectangular cross section with a first vertically extending side wall 154, a second vertically extending side wall 156A that extends parallel to the first side wall, and front and rear walls 158 and 160 (FIG. 8A), respectively, that extend between the first and second side walls to thereby form a hollow interior 162A for receiving the liquid to be measured. The parallel walls are perceived in perspective by the image module 88, with or without the lens 78, so that the walls appear to be converging toward each other as the distance between the image module and lower end of the walls increases.

It will be understood that the converging surfaces in the previous embodiments can also be parallel surfaces without departing from the spirit and scope of the invention, as long as the parallel surfaces are perceived to be converging so that a substantial portion of the measurement surface(s) can be viewed by the image module and any differences between an "empty" condition of the transducer and a partially filled or full condition can be detected.

Although the present invention has been described in conjunction with detecting the level of a liquid, it will be understood that the term "liquid" can refer to any material (whether fluent or solid) that, when in contact with the optical probe, causes a measurable change in light intensity, color or other optical property as detected by the image module. It will be further understood that terms of orientation and/or position such as upper, lower, vertical, front, rear, and so on, relate to relative rather than absolute orientations and/or positions.

It will be appreciated by those skilled in the art that changes could be made to the embodiments described above without departing from the broad inventive concept thereof. By way of example the probe section can have different cross sectional profiles, wall thicknesses, sizes, lengths, and so on. Moreover, the wall or walls of the probe section can be directly illuminated by providing a transparent or translucent wall with a roughened or patterned surface to redirect the light outwardly from the wall, to thereby create a side illumination effect. In addition, although several embodiments for converging measuring surfaces have been shown, the term "converging" also relates to parallel surfaces that appear converging when viewed in perspective, either directly by the human eye, through one or more lenses, and/or through one or more image modules.

It will be understood, therefore, that this invention is not limited to the particular embodiments disclosed, but it is intended to cover modifications within the spirit and scope of the present invention as defined by the appended claims.

I claim:

1. An optical liquid level transducer comprising:
   a probe section having a measurement surface adapted to extend into a liquid to be measured;
   a light source positioned for directing radiant energy onto at least one of the measurement surface and the liquid to be measured;
   an image module positioned above the probe section and oriented for capturing a plurality of images in an axial direction of at least a portion of the measurement surface, wherein differences in the captured images are indicative of different liquid level conditions with respect to the measurement surface; and
   a processor for determining each of the liquid level conditions based on the captured images.

2. An optical liquid level transducer according to claim 1, wherein the probe section comprises a continuous side wall, the measurement surface including at least a portion of the continuous side wall.

3. An optical liquid level transducer according to claim 2, wherein the continuous side wall defines a hollow interior for receiving the liquid to be measured.

4. An optical liquid level transducer according to claim 3, wherein the image module is positioned for capturing the plurality of images axially along the hollow interior for determining the different liquid level conditions.

5. An optical liquid level transducer according to claim 4, wherein the measurement surface extends parallel to a central axis of the probe section.

6. An optical liquid level transducer according to claim 4, wherein the measurement surface extends transverse to a central axis of the probe section.

7. An optical liquid level transducer according to claim 2, wherein the probe section is solid and the continuous side wall defines an outer surface of the solid probe section, the measurement surface including at least a portion of the outer surface.

8. An optical liquid level transducer according to claim 7, wherein the image module is positioned for capturing the plurality of images axially along the outer surface.

9. An optical liquid level transducer according to claim 8, wherein the measurement surface extends parallel to a central axis of the probe section.

10. An optical liquid level transducer according to claim 8, wherein the measurement surface extends transverse to a central axis of the probe section.

11. An optical liquid level transducer according to claim 1, wherein the measurement surface extends parallel to a central axis of the probe section.

12. An optical liquid level transducer according to claim 1, wherein the measurement surface extends transverse to a central axis of the probe section.

13. An optical liquid level transducer according to claim 1, wherein the image module is a digital image module with a plurality of pixels for capturing the plurality of images associated with the plurality of liquid level conditions.

14. An optical liquid level transducer according to claim 13, wherein the processor includes means for analyzing a at least some of the plurality of pixels to thereby determine the liquid level.

15. An optical liquid level transducer according to claim 14, wherein the means for analyzing comprises determining a common characteristic of a plurality of pixels, the common characteristic comprises at least one of an on state, an off state, and a color state of each pixel of the at least some of the plurality of pixels for each of the plurality of images for determining the plurality of liquid level conditions.

16. An optical liquid level transducer according to claim 14, wherein the means for analyzing comprises recognizing a particular pattern detected by a plurality of the pixels.

17. A method of determining a liquid level condition within a container, comprising:
   extending a probe with a measurement surface into a liquid to be measured;
   capturing a plurality of digital images of at least a portion of the measurement surface in an axial direction; and
   determining a plurality of liquid level conditions based on the plurality of captured digital images, wherein differences in the captured digital images are indicative of different liquid level conditions with respect to the measurement surface.

18. A method according to claim 17, and further comprising:
   providing a plurality of pixels for capturing the digital image, each pixel being capable of detecting different brightness values;
   setting a brightness threshold value;
   comparing the brightness threshold value to the brightness level of at least some of the pixels; and
   determining the liquid level by counting the pixels above and/or below the brightness threshold value.

19. A method according to claim 17, and further comprising analyzing a plurality of pixels having a common characteristic to thereby determine one of the plurality of liquid level conditions.

20. A method according to claim 19, wherein the common characteristic comprises determining at least one of an on state, an off state, and a color state of each pixel.

21. A method according to claim 19, wherein the common characteristic comprises determining a particular pattern detected by a plurality of the pixels.

22. An optical liquid level transducer according to claim 14, wherein:
   each pixel is capable of detecting different brightness values;
   the processor is configured for setting a brightness threshold value; and
   the means for analyzing comprises comparing the brightness threshold value to the brightness level of at least some of the pixels;
   wherein the liquid level is determined by counting the pixels above and/or below the brightness threshold value.

* * * * *